US012769321B2

(12) United States Patent
Trank et al.

(10) Patent No.: US 12,769,321 B2
(45) Date of Patent: Oct. 20, 2026

(54) NEAR REAL-TIME DATA AND VIDEO STREAMING SYSTEM FOR A VEHICLE, ROBOT OR DRONE

(71) Applicant: Guident Ltd., London (GB)

(72) Inventors: Michael J. Trank, Pompano Beach, FL (US); Gabriel Castaneda, Pompano Beach, FL (US)

(73) Assignee: Guident Corp., Boca Raton, FL (US)

(*) Notice: Subject to any disclaimer, the term of this patent is extended or adjusted under 35 U.S.C. 154(b) by 0 days.

(21) Appl. No.: 19/059,930

(22) Filed: Feb. 21, 2025

(65) Prior Publication Data

US 2025/0189965 A1 Jun. 12, 2025

Related U.S. Application Data

(63) Continuation of application No. 17/579,203, filed on Jan. 19, 2022, now Pat. No. 12,271,192, which is a
(Continued)

(51) Int. Cl.
*H04N 19/00* (2014.01)
*G05D 1/224* (2024.01)
(Continued)

(52) U.S. Cl.
CPC ............ *G05D 1/2247* (2024.01); *G06T 1/20* (2013.01); *H04L 63/0457* (2013.01);
(Continued)

(58) Field of Classification Search
CPC ...... G05D 1/2247; G05D 1/2265; G06T 1/20; H04L 63/0457; H04L 65/61; H04L 65/65;
(Continued)

(56) References Cited

U.S. PATENT DOCUMENTS 7,538,764 B2 * 5/2009 Salomie .................. G06T 17/20 380/232
8,874,301 B1 10/2014 Rao et al.
(Continued)

FOREIGN PATENT DOCUMENTS

CN 108605143 A * 9/2018 .......... H04N 19/117
EP 3124348 A1 2/2017
(Continued)

OTHER PUBLICATIONS

Notification of Transmittal of the International Search Report and the Written Opinion of the International Searching Authority, or the Declaration, International Search Report, Written Opinion of the International Searching Authority for PCT Application No. PCT/US2020/021171, mailed Jun. 10, 2020.
(Continued)

*Primary Examiner* — Frank F Huang
(74) *Attorney, Agent, or Firm* — Ellenoff Grossman & Schole LLP; John Stellabotte; Danielle Cohen

(57) ABSTRACT

A system is disclosed. The system has an ultra-low latency data and video streaming module, comprising computer-executable code stored in non-volatile memory, a processor, a control center device, and a plurality of vehicle, robot or drone units that operate remotely from the control center device, each of the plurality of units including a control device. The control module, the processor, the control center device, and the control devices are configured to video stream using one or more camera modules disposed at each of the plurality of units, transfer the video streams from the control devices to the control center device.

21 Claims, 3 Drawing Sheets

Related U.S. Application Data continuation-in-part of application No. 17/025,152, filed on Sep. 18, 2020, now Pat. No. 11,713,060.

(51) Int. Cl.

| | |
|---|---|
| ***G06T 1/20*** | (2006.01) |
| ***H04L 9/40*** | (2022.01) |
| ***H04L 65/61*** | (2022.01) |
| ***H04N 7/18*** | (2006.01) |
| ***H04N 19/436*** | (2014.01) |
| ***H04N 23/661*** | (2023.01) |
| ***H04N 23/698*** | (2023.01) |
| *B64U 101/30* | (2023.01) |
| *H04L 65/65* | (2022.01) |

(52) U.S. Cl.
CPC ............. *H04L 65/61* (2022.05); *H04N 7/181* (2013.01); *H04N 7/185* (2013.01); *H04N 19/436* (2014.11); *H04N 23/661* (2023.01); *H04N 23/698* (2023.01); *B64U 2101/30* (2023.01); *B64U 2201/20* (2023.01); *H04L 65/65* (2022.05)

(58) Field of Classification Search
CPC ...... H04N 7/181; H04N 7/185; H04N 19/436; H04N 23/661; H04N 23/698; B64U 2101/30; B64U 2201/20
See application file for complete search history.

(56) References Cited

U.S. PATENT DOCUMENTS

| | | | | |
|---|---|---|---|---|
| 9,120,484 | B1 | 9/2015 | Ferguson et al. | |
| 9,429,943 | B2 | 8/2016 | Wilson et al. | |
| 9,475,496 | B2 | 10/2016 | Attard et al. | |
| 9,964,948 | B2 | 5/2018 | Ullrich et al. | |
| 10,166,994 | B1 | 1/2019 | Fields et al. | |
| 10,638,130 | B1 * | 4/2020 | Alakuijala | H04N 19/137 |
| 10,699,580 | B1 | 6/2020 | Gross | |
| 2004/0125103 | A1 * | 7/2004 | Kaufman | G06T 15/08 345/419 |
| 2009/0105902 | A1 | 4/2009 | Choi et al. | |
| 2009/0252431 | A1 * | 10/2009 | Lu | H04N 19/172 382/255 |
| 2009/0295800 | A1 * | 12/2009 | Vetter | G06T 15/08 345/424 |
| 2014/0052323 | A1 | 2/2014 | Reichel et al. | |
| 2014/0192904 | A1 * | 7/2014 | Rosewarne | H04N 19/60 375/240.29 |
| 2015/0172705 | A1 * | 6/2015 | Lee | H04N 19/132 375/240.16 |
| 2017/0090476 | A1 | 3/2017 | Letwin et al. | |
| 2017/0192423 | A1 | 7/2017 | Rust et al. | |
| 2017/0192426 | A1 | 7/2017 | Rust et al. | |
| 2017/0274906 | A1 | 9/2017 | Hassan et al. | |
| 2018/0102001 | A1 | 4/2018 | Faust et al. | |
| 2018/0343449 | A1 * | 11/2018 | Amer | G06T 5/70 |
| 2018/0354411 | A1 | 12/2018 | Friedland et al. | |
| 2019/0011931 | A1 | 1/2019 | Selvarn et al. | |
| 2019/0075301 | A1 * | 3/2019 | Chou | H04N 19/159 |
| 2019/0272616 | A1 * | 9/2019 | Lee | G06T 3/16 |
| 2019/0281293 | A1 * | 9/2019 | Lin | H04N 19/86 |
| 2020/0062250 | A1 | 2/2020 | Boulton | |

FOREIGN PATENT DOCUMENTS

| | | | |
|---|---|---|---|
| EP | 3401786 | A2 | 11/2018 |
| WO | 2015099679 | A1 | 7/2015 |
| WO | 2018175808 | A1 | 9/2018 |
| WO | 2018232032 | A1 | 12/2018 |
| WO | 2019147569 | A1 | 8/2019 |
| WO | 2019180700 | A1 | 9/2019 |

OTHER PUBLICATIONS

International Search Report and Written Opinion, PCT/1B2020/050548, mailed Apr. 22, 2020.
PCT Patent Application No. PCT/US2020/021171 filed on Mar. 5, 2020.
International Search report and Written Opinion, PCT/US20/21171, dated Jun. 10, 2020.
Extended European Search Report issued for European Patent Application No. EP21196077.8, dated Feb. 15, 2022.
"Waymo Self-Driving Taxi Goes Rogue, Blocking Traffic & Evading Capture" by Johnna Crider dated May 13, 2021, in Clean Technica.
Cruise autonomous vehicle with no human driver pulled over by San Francisco police by Bloomberg dated Apr. 12, 2022, in Automotive News.

* cited by examiner

NEAR REAL-TIME DATA AND VIDEO STREAMING SYSTEM FOR A VEHICLE, ROBOT OR DRONE

CROSS-REFERENCE TO RELATED APPLICATIONS

This application is a continuation of U.S. nonprovisional patent application Ser. No. 17/579,203 filed on Jan. 19, 2022, and entitled "Near Real-Time Data and Video Streaming System For a Vehicle, Robot or Drone" which is a continuation-in part of U.S. nonprovisional patent application Ser. No. 17/025,152, now U.S. Pat. No. 11,713,060, filed on Sep. 18, 2020, and entitled "Systems and Methods for Remote Monitoring of a Vehicle, Robot or Drone," the entire disclosures of which are incorporated herein by reference.

TECHNICAL FIELD

The present disclosure is directed to a near real-time data and video streaming system and method for remote monitoring and controlling, and more particularly, to a system and method for remote monitoring and controlling of vehicles, robots, or drones.

BACKGROUND OF THE DISCLOSURE

Autonomous vehicles (AVs), robots or drones use various computer processing systems to control operation of the autonomous unit. Autonomous vehicles may utilize an initial input from an operator, such as a pilot, driver, or passenger to engage the autonomous operation system and then operate thereafter in modes with varying degrees of human input ranging from SAE J3016 Level 3 to Level 4 or 5 autonomous mode (where the vehicle essentially drives by itself in any scenario) to permitting a human operator to fully override the autonomous mode and have full manual control over the unit, and the full range of modes between the two extremes, with the potential for intermittent human input and control. Autonomous vehicles, robots or drones may include sensors, cameras, lidar, sonar, and radar to detect cars, pedestrians, and their respective proximities and characteristics. They may also rely on Global Positioning Systems (GPS) and High-Definition (HD) maps for navigation. The detection and identification of objects and information related to objects and navigation capabilities may contribute to the safe operation of autonomous units.

There is a high degree of uncertainty about the safety of autonomous units using AI, which hampers mass adaption of Level 4 or Level 5 AVs. Regulatory criteria in some jurisdictions make it mandatory to have back-up human operators taking control of an AV in the event of an accident or mishap. These operators may be in the vehicle or located remotely.

Some autonomous vehicle implementations include methods and systems to help increase safety and consumer satisfaction with autonomous units and help bridge the gap towards complete autonomy. For example, U.S. patent application Ser. No. 17/025,152 filed by Guident, Ltd., describes methods and systems for monitoring and controlling autonomous units. Among the methods and systems discussed is a Remote Monitor and Control Center (RMCC) staffed by trained human analysts and remote-control operators and equipped with communications facilities and computer workstations outfitted with software and hardware for displaying data arriving from the deployed autonomous devices and for remote control of the devices. The autonomous devices are able to send their sensory input data, including camera video data to the control center and the control center can send control instructions to the autonomous devices through a two-way communications link. However, U.S. patent application Ser. No. 17/025,152 does not specifically address the video streaming system and method of monitoring multiple independent autonomous units, taking control of one or more of the independent autonomous units to govern the vehicles' operation when a dangerous operating safety condition is detected, and returning control to the one or more independent autonomous units when safe operation is restored.

In the proposed remote monitor and control center, in order to have safe and effective control of the vehicle or other autonomous device, robot or drone, the Remote-Control Operator (RCO) should be able to react quickly to events happening around the unit. Video latency, in the context of remote monitor and control, is the delay between the point in time that a camera sensor captures each image frame and the subsequent point in time that the same image frame is displayed on the remote-control operator's screen. For safety reasons, it will be desired that this video latency be relatively short. The reason is illustrated by this example: if video latency between a vehicle and a remote monitor and control workstation is 500 ms, and the vehicle is moving at 60 km/hour, it will have travelled a distance of 8.3 meters before the remote-control operator can observe and begin to react. The average driver can react to a condition on the road in 1.5 seconds, that is 25 meters travelled before brakes can be fully applied.[1] By the time the vehicle will have received the command to stop, the vehicle already travelled 41.66 meters without accounting the distance the vehicle will take to fully stop. For this reason, minimizing the video latency to as close to real-time as possible is essential for remote-control systems.

1 Source: Mannering, Fred L., and Scott S. Washburn. Principles of highway engineering and traffic analysis. John Wiley & Sons. Fifth Edition. p.40

There are several factors that contribute to video latency in the context described above. The sum of the video latency contributed by each of these factors is the resulting total video latency between the time that an image frame is captured by camera in the autonomous vehicle, robot or drone and the time that the image frame is reproduced onto the video display of the remote monitor and control workstation. To be useful for the safe remote control of an autonomous vehicle, robot or drone by a remote-control operator, the video image stream should have a frame size in the high-definition range, that is 1280×720 (720p) or 1920×1080 (1080p) pixels. A serialized baseband stream of images produced at 30 frames per second or more, is typically too much data to be transmitted at low latency through a single channel on a mobile data network. For this reason, high-definition video streams are usually encoded using a video codec before transmission on a communications channel. The encoding and subsequent decoding of video streams from HD video codecs such as H.264, H.265, VP8 or VP9 involves a great amount of mathematical processing and are themselves factors that contribute to total video latency.

Besides encoding and decoding latencies, another chief factor contributing to video latency is the time of transit through the network for each frame in the video stream between the autonomous device being monitored and/or controlled and the remote monitor and control workstation. This includes the delay introduced by the mobile data network itself (the one-way travel time of Internet Protocol (IP) packets from a modem terminal in the autonomous vehicle connected to a particular mobile data network to nodes on the public Internet) as well as additional delay that may be introduced by the relaying of the encoded frames before reaching the remote monitor and control workstation.

By optimizing the software and hardware employed in the construction of the remote monitor and control workstation as well as the system that concentrates and transmits the camera video streams, total video latency on the order of 70 milliseconds is achievable. A further reduction of total video latency to under 40 milliseconds as well as a better quality and less jittery video stream can be achieved by using a private mobile data network. Private networks which use LTE or 5G technology can be constructed using CBRS frequency bands. These networks may be feasibly and economically designed for areas covering a geographical region of focus of on the order of a few square kilometers, and may have their utilization reserved only for a consortium of public safety organizations.

This section provides background information related to the present disclosure, which Applicant does not concede is prior art.

The exemplary disclosed system and method of the present disclosure is directed to overcoming one or more of the shortcomings set forth above and/or other deficiencies in existing technology.

SUMMARY OF THE DISCLOSURE

In one exemplary aspect, the present disclosure is directed to a system. The system includes a control module, comprising computer-executable code stored in non-volatile memory, a processor, a control center device, and a plurality of devices that operate remotely from the control center device, each of the plurality of devices including a control device. The control device is configured to collect video streams from multiple cameras, computationally process the video streams, including combining two or more camera image streams into a single panorama if suitable, encode and transfer the processed video streams from the control devices to the control center device, and decode and display the video streams to the remote operator's monitor.

In another aspect, the present disclosure is directed to a method. The method includes providing a control center device, providing a plurality of devices that operate remotely from the control center device, each of the plurality of devices including a control device, collecting data using one or more collection devices disposed at each of the plurality of devices, processing the collected data using the control devices disposed at the plurality of devices, and transferring the processed data from the control devices to the control center device when the plurality of devices are remotely operating without control by the control center device.

Exemplary embodiments of units (vehicles, terrestrial or aerial drones, or robots) methods systems and unit's embedded systems for remote control and monitoring are described herein.

In at least some exemplary embodiments, a generic smart remote monitor and control device (G-SRMCD) may be provided comprising at least one processing device and installed in the unit, the G-SRMCD programmed and configured to receive data from various sensors in a vehicle, robot or drone, and to determine the Incident Risk Level (IRL) to inform the Remote Monitor and Control Center (RMCC) in electronic communication if the autonomous unit will be provided assistance (e.g., and an agent in the RMCC can take control at any time of the vehicle, robot or drone). For example, the G-SRMCD may transfer control to the RMCC.

In another embodiment, the G-SRMCD may be programmed and configured further to transmit video streams from multiple camera or other sensors installed in the autonomous or non-autonomous vehicle, robot or drone, to an RMCC-based workstation if and when commanded by an operator at the RMCC.

In another embodiment, the G-SRMCD may be programmed and configured further to establish and maintain a persistent communications channel (through a mobile or Wi-Fi data network virtual circuit using secure, encrypted TCP-based network protocols Transport Layer Security "TLS" or secure Websocket "WSS") to a server based at the RMCC or some other fixed location.

In another embodiment, the G-SRMCD may be programmed and configured further to support 4G LTE, private wireless, 5G or Wi-Fi modems and antennas for wireless data connectivity to the RMCC. In at least some exemplary embodiments, transferring processed data from control devices (e.g., G-SRMCD) to the control center device (e.g., RMCC) may include transferring a relatively high bandwidth audio and video streams via either a Wi-Fi network or a commercial public or a private mobile data network using either LTE or 5G cellular network standards (with the goal of ensuring a relatively low latency for the arrival of the video frames at the RMCC monitoring workstation).

In another embodiment, the G-SRMCD may be equipped and configured with MIPI CSI-2 sensor interfaces for interfacing camera sensors.

In another embodiment, the G-SRMCD may be equipped and configured further with GPU co-processors for the purposes of processing the camera image streams, including the pre-transmission encoding and the post-transcoding decoding of the video stream, and for other application-specific tasks that involve parallel processing. The G-SRMCD's CPU and GPU may be constructed as a combination System-On-Module (SOM) as offered by vendors such as NVIDIA, Texas Instruments, Intel and others.

In another embodiment, the G-SRMCD may be equipped and configured further with an FPD-Link III, GMSL or GMSL2 serializer and deserializer modules, which enables camera sensors equipped with the corresponding serializer module to be connected to the G-SRMCD via coax cable at distances of on the order of 15 meters.

In another embodiment, the G-SRMCD may be programmed and configured further to support the WebRTC protocol as specified by IETF RFC 8825. The WebRTC protocol supports reliable session establishment, voice and video encryption, and allows platform and device independence. The remote-control operators employ WebRTC-enabled browsers to display multiple video streams from the units.

In another embodiment, the G-SRMCD may be programmed and configured further to read camera image data from camera sensors connected via MIPI CSI-2 interface (extended via FPD-Link III or GMSL/GMSL2 serializer and deserializer interfaces) using a software library and application programming interface provided by the embedded system-on-module vendor to place the camera image frame bitstream directly into a "zero-copy" EGL context.

In another embodiment, the G-SRMCD may be programmed and configured further to use the EGL interface to move the camera image frame bitstream along through the several components of the video processing pipeline.

In another embodiment, the G-SRMCD may be programmed and configured further to use a hardware-based Image Signal Processor (ISP) provided by the embedded system-on-module and made available via a software library for Bayer to YUV conversion.

In another embodiment, the G-SRMCD may be programmed and configured further to use a General-Purpose Computing on GPUs (GPGPU) parallel computing resources environment such as OpenCL or CUDA provided by the embedded system-on-module to computationally combine the image frame bitstreams from two or more cameras into a single larger seamless image stream with a wider panorama.

In another embodiment, the G-SRMCD may be programmed and configured further to use the GPGPU parallel processing resources provided by the embedded system-on-module to computationally embed a 64-bit binary number representing an NTP timestamp into the corner pixels of an image frame in the video stream by replacing the images original pixels with solid black or white pixels representing zeros or ones of the 64-bit binary number.

In another embodiment, the G-SRMCD may be programmed and configured further to use an accelerated video encoder that encodes a video stream into a lower bitrate bitstream with one of several standard video codecs (such as H.264, H.265, VP8, and VP9) using GPU parallel processing on the embedded system-on-module.

In another embodiment, the G-SRMCD may be programmed and configured further to format the encoded bitstream into RTP or SRTP messages as specified in IETF RFC 3550, IETF RFC 3711, IETF RFC 6184, IETF RFC 7798, IETF RFC 7741 and IETF draft-ietf-payload-vp9.

In another embodiment, the G-SRMCD may be programmed and configured further to negotiate the transmission of the RTP/SRTP audio and video streams to the remote monitor and control center using ICE protocols as specified by the WebRTC RTCPeerConnection application programming interface, IETF RFC 8825 and IETF RFC 8834.

In another embodiment, the G-SRMCD may be programmed and configured further to establish a secure websocket (WSS) connection to an internet cloud-based server as specified in IETF RFC 6455 for the purpose of performing the WebRTC session negotiation with the remote monitor and control workstation, the purpose of which is to establish the RTP/UDP, SRTP/UDP and SCTP data channel paths for the exchange of camera image streams and command and control data with the remote monitoring and control center.

In another embodiment, the G-SRMCD may be programmed and configured further to establish a two-way data exchange on the data channel as provided by the WebRTC RTCPeerConnection specification, IETF RFC 8831 and IETF RFC 8832 to exchange timestamped command, control and telemetry feedback messages between the G-SRMCD and the remote monitor and control workstation.

In another embodiment, the G-SRMCD may be programmed and configured further to support the WebRTC data channel to exchange status and alarm messages between the G-SRMCD and the RMCC that indicate loss of incoming signal, late arrival of command messages, safety alerts, etc.

In another embodiment, the G-SRMCD may be programmed and configured further to use the timestamps contained in the messages carried by the WebRTC data channel to maintain state variables indicating that messages arriving at the G-SRMCD from the RMCC arrived with sufficiently low delay for safe teleoperation from the time they were sent, and that messages from the RMCC acknowledging sufficiently timely arrival for safe teleoperation of messages sent to the RMCC from the G-SRMCD.

In another embodiment, the G-SRMCD may be programmed and configured further to support the WebRTC data channel to remotely control a vehicle, robot or drone.

In another embodiment, the G-SRMCD may be programmed and configured further to remotely set up controllable camera and video controls for adjusting to low light, adjusting bitrate, panning across a wide screen, noise reduction, automatic focus, automatic exposure, automatic white-balance, lens-shading compensation, demosaic filter, 3×3 color transform, edge enhancement, color artifact suppression, downscaling, etc.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still within the spirit of the disclosure as described herein.

DETAILED DESCRIPTION AND INDUSTRIAL APPLICABILITY

Figure 1:
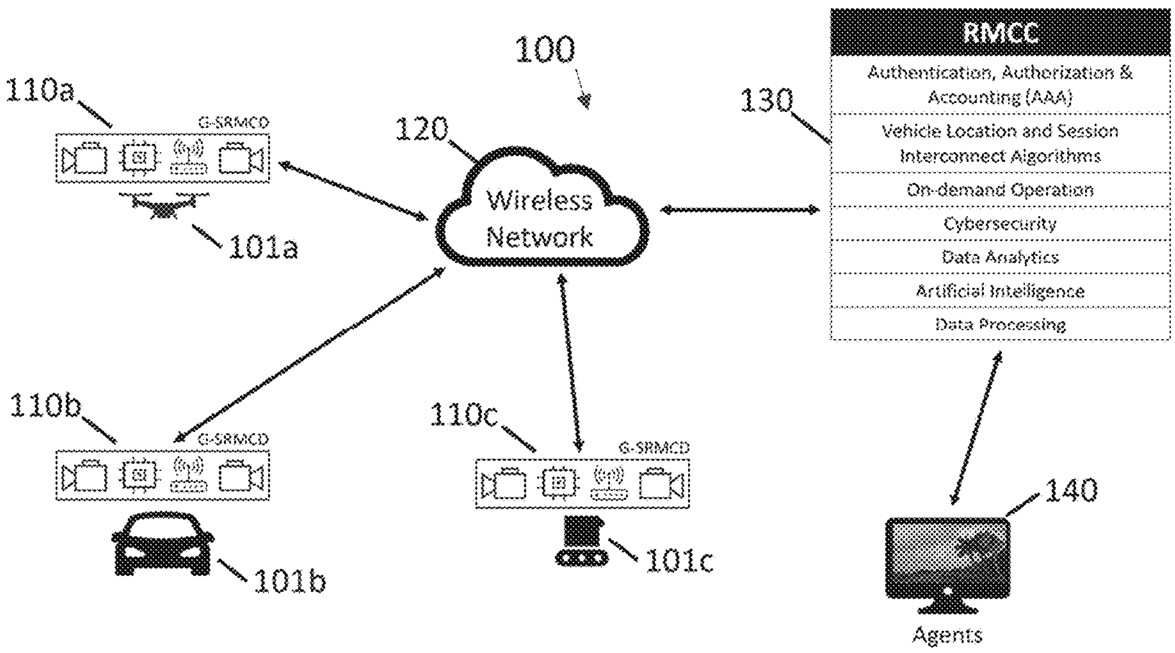
FIG. 1 is a graphical representation of several units internetworked with an exemplary disclosed remote monitor and control center (RMCC) system and an exemplary disclosed remote-control agent workstation. The RMCC and agent workstation that may be configured to supervise the operating safety of independently governed units, take control of the units to restore safe operation in response to unsafe operation recognized by the RMCC or the Generic Smart Remote Monitor and Control Device (G-SRMCD), and in response to determining safe unit operation has been restored, return control to the units. The RMCC includes components, such as authentication/authorization/accounting (AAA), vehicle location and session interconnect algorithms, data analytics tools, cyber security software, data processing capabilities and an advanced artificial intelligence (AI) software layer for an on-demand operation. The G-SRMCD is installed in the units and includes multiple camera modules, an embedded computer board with a CPU and GPU co-processors and interfaces for the camera modules and a wireless mobile data modem.

In at least some exemplary embodiments, the exemplary disclosed system may include a Generic Smart Remote Monitor and Control Device (G-SRMCD) for a vehicle, robot or drone. The exemplary disclosed system and method may provide remote control of a vehicle, robot, or drone. In at least some exemplary embodiments, the exemplary disclosed system and method may provide a device that may be placed in the vehicle, robot, or drone to remotely monitor and control the unit in the event the unit is to receive remote assistance. In at least some exemplary embodiments, the exemplary disclosed system and method describes a device that may be placed in a vehicle, robot, or drone to remotely monitor the unit in the event real-time monitoring is required.

Disclosed herein are various embodiments related to ultra-low latency video streaming system for remote monitor and control of independently operating vehicles, drones and robots, between the units and a monitor and control center remote from the units, for improved safety. Reference will now be made in detail to the description of exemplary embodiments as illustrated in the drawings, wherein like reference numbers indicate like parts throughout the several views.

FIG. 1 illustrates a graphical representation of various elements included in the exemplary disclosed RMCC and G-SRMCDs installed in vehicles, robots or drones. For example, the RMCC system 100 may include vehicles, drones, and robots 101*a*, 101*b*, and 101*c*, and a control component such as a remote monitoring and control center (RMCC) 130, which may include processing circuitry and application software implementing various features of the RMCC system. In the illustrated example, the RMCC 130 may include data analytics and AI software modules integrated with cybersecurity and data processing implementations providing on-demand operation for AI-based unit remote monitoring and control services. The exemplary embodiment of FIG. 1 illustrates three units 101*a*, 101*b*, and 101*c*. Also for example, an embodiment RMCC 130 may remotely monitor and control a greater number of similar units. In at least some exemplary embodiments, the processing circuitry may be implemented as at least a portion of a microprocessor. The processing circuitry may be implemented using one or more circuits, one or more microprocessors, microcontrollers, application specific integrated circuits, dedicated hardware, digital signal processors, microcomputers, central processing units, graphic processing units, field programmable gate arrays, programmable logic devices, state machines, super computers, or any combination thereof. In yet other embodiments, the processing circuitry may include one or more software modules executable within one or more processing circuits. The processing circuitry may further include memory configured to store instructions and/or code that causes the processing circuitry to execute data communication functions.

The units 101*a*, 101*b*, and 101*c*, may include devices 110*a*, 110*b*, and 110*c* respectively installed in the unit to communicate via a wireless network 120 such as, e.g., a wireless local area network (WLAN), private network and/or cellular network. The devices 110*a*, 110*b*, and 110*c* can include processing circuitry (e.g., a transmitter, receiver, and/or transceiver) to support the wireless communications. For example, the devices 110*a*, 110*b*, and 110*c* may support cellular communications such as, e.g., a cellular data connection such as third generation (3G), fourth generation (4G), long term evolution (LTE), fifth generation (5G), Wi-Fi networks or other data communication standard. The units 101*a*, 101*b*, and 101*c*, and/or devices 110*a*, 110*b*, and 110*c* may support wireless communications such as, e.g., IEEE 802.11a/b/g/n and Wi-Fi 6, also known as 802.11ax. Processing circuitry of the units 101*a*, 101*b*, and 101*c*, and devices 110*a*, 110*b*, and 110*c* can also support GPS capabilities to determine their geographical location. The RMCC system 100 can use applications that are independent of the remote operator device platform or operating system (e.g., Android, iOS, Linux, webOS, Windows, etc.) and/or the unit type, make, model, and manufacturer. Communication with the RMCC 130 can be carried out via a network 120 (e.g., the Internet, private network, VPN, Wi-Fi, etc.) that is communicatively coupled to the wireless network 120. The RMCC 130 may be implemented as, e.g., a web service on a processing system such as one or more servers. Such web services can be used from a private or public data center. The RMCC 130 may employ data fusion techniques to combine data accessible from the sensors in the units 101*a*, 101*b*, and 101*c*and devices 110*a*, 110*b*, and 110*c* into composite data, and the RMCC may base decisions on AI-based learning from the composite data thus formed.

The remote-control operator can request via the G-SRMCDs 110*a*, 110*b* and 110*c* to enable manual operation of units 101*a*, 101*b*, and 101*c*in the event, for example, autonomous operation is disabled or unsafe, following an incident, such as an accident.

A streaming video system may be used in the G-SRMCDs 110*a*, 110*b*, and 110*c* to provide real time images around and inside the cabin of a vehicle. Data from the streaming video system may be used to collect stereovision quality picture data that can be fed to processing circuitry such as, e.g., a microcontroller, microprocessors, or GPUs for processing. The streaming video system may include, for example, image sensors, stereo cameras, infrared cameras, microcontrollers, microprocessors, GPUs, and connective components. Positional data to keep track of the units 101*a*, 101*b*, and 101*c*at various locations may also be gathered. GPS units in the units 101*a*, 101*b*, and 101*c*, and in an emergency, may be used to retrieve positional data.

Figure 2:
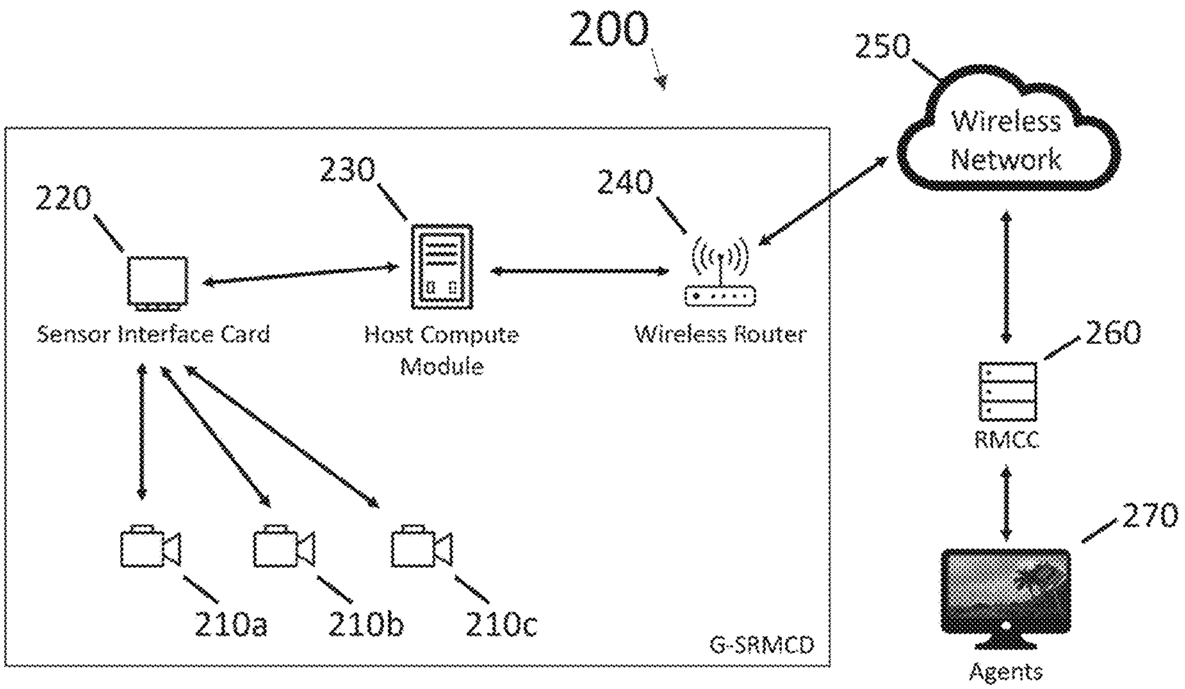
FIG. 2 is a graphical representation of the ultra-low latency video streaming system in a smart remote monitor and control device (G-SRMCD) employed in the RMCC architecture of FIG. 1 in accordance with various embodiments of the present disclosure.

FIG. 2 illustrates a schematic block diagram of an exemplary G-SRMCD's ultra-low latency video streaming system. The G-SRMCD may include one or more advanced RISC machine (ARM), GPU or CPU processors circuit and operates on a host compute module (HCM) 230. The HCM may include multiple ports and interfaces to connect to the unit and hardware components of the G-SRMCD. The host compute module 230 may also host Ethernet, USB, PCIe, MIPI, GMSL, GMSL2, FPDLink III or eSATA interfaces for interconnecting hardware components of the G-SRMCD such as cameras, sensors, and wireless modems.

The host compute module 230 may be a microprocessor-based computer board using either an ARM or Intel processor. It should be understood that the G-SRMCD can be implemented in hardware logic, software logic, or a combination of hardware and software logic. In this regard, the G-SRMCD can be or can include any of a digital signal processor (DSP), microprocessor, microcontroller, GPU, or other programmable device which are programmed with software implementing the above described methods. It should be understood that alternatively the G-SRMCD is or includes other logic devices, such as a Field Programmable Gate Array (FPGA), a complex programmable logic device (CPLD), or application specific integrated circuit (ASIC). When it is stated that G-SRMCD performs a function or is configured to perform a function, it should be understood that G-SRMCD is configured to do so with appropriate logic (such as in software, hardware, logic devices, or a combination thereof).

The G-SRMCD may contain hardware to communicate via a wireless network 250 such as, e.g., a wireless local area network (WLAN) and/or cellular or Wi-Fi network. The G-SRMCD can include processing circuitry 240 (e.g., a transmitter, receiver, and/or transceiver) to support the wireless communications. For example, the G-SRMCD may support cellular communications such as, e.g., a cellular data connection such as third generation (3G), fourth generation (4G), long term evolution (LTE), fifth generation (5G), Wi-Fi, or other data communication standard. The G-SRMCD may support wireless communications such as, e.g., IEEE 802.11a/b/g/n and Wi-Fi 6, also known as 802.11ax. The wireless circuitry 240 can be configured to process redundant wireless link connections to the RMCC. Multiple wireless data connections using different wireless bands, private LTE networks or service providers can provide a substantially guaranteed and safe connection to the RMCC 260.

In addition, the G-SRMCD may include multiple sensors 210*a*, 210*b* and 210*c*that are integrated into a vehicle, robot or drone and used to video stream live images to the remote-control operator 270. The video streams may be transmitted to the RMCC 260 (e.g., that may be generally similar to RMCC 130) via a wireless public or private network 250, the device(s) 240 is the data receiver and transmitter of the G-SRMCD. Multiple sensor devices may be installed in a unit, and the remote-control operator can select the cameras to watch and if enabled, remotely control and drive the unit. The G-SRMCD can take advantage of the host compute module (HCM) 230 processing circuitry to utilize hardware encoders and generate video faster than using software-based algorithms. The system can be extended to employ any sensor modality including lidars, radars, ultrasonic sensors, etc. A more powerful system can be realized by the fusion of a multimodal-sensor system such as any suitable combination of cameras, lidars, radars, and/or ultrasonic sensors.

In cases of sensor modalities that generate a large amount of data, data compression may be utilized. Hence, in the case of using visual sensors, video compression and decompression may be used to achieve efficient communication among the vehicles and/or infrastructure. Any suitable video coding standards or technology that is either standalone or built-in within cameras may be used. The G-SRMCD may include one or more camera interfaces of type Mobile Industry Processor Interface Alliance (MIPI) CSI-2 for the purpose of connecting camera sensors 210*a*, 210*b* and 210*c*, which may be equipped with complementary MIPI CSI-2 interfaces. Camera sensors equipped with MIPI CSI-2 interfaces bring advanced computer vision capabilities and reduce the number of wires, toggle rate and power consumption. Camera sensors connected via MIPI CSI-2 (e.g., a MIPI CSI-2 sensor interface) to the HCM 230 are suitable for constructing an ultra-low latency video processing pipeline since the MIPI CSI-2 allows the HCM 230-based image signal processor to be used rather than relying on the operating system's kernel driver to perform demosaicing and Bayer to YUV conversion. MIPI CSI-2 is a high-bandwidth interface between sensors 210*a*, 210*b* and 210*c*and the host compute module 230, and if the distance is greater than 30 cm, the Flat Panel Display Link III (FPD-Link III) serializer/deserializer modules may be used to transport the images from the sensors to the HCM 230. The sensor interface card 220 may contain a serializer that translates from MIPI CSI-2 to FPD-Link III and a deserializer translates from FPD-Link III back to MIPI CSI-2. In some implementations, a serializer board may be installed per sensor module 210*a*, 210*b* and 210*c*, while a deserializer board (in the sensor interface card 220) may be installed near the MIPI CSI-2 input of the HCM 230. The connection between the serializer and deserializer is via a coaxial cable, the FPD-Link III allows for cable lengths up to 15 m.

The G-SRMCD may use web real-time communication (WebRTC) technology as specified by IETF RFC 8825, IETF RFC 8829 and IETF RFC 8834. The G-SRMCD may be configured and programmed to use the RTCPeerConnection specification by responding to connection requests from the remote-control operator 270 arriving through the vehicle locator and interconnect function of the RMCC 260 in order to establish secure, encrypted peer-to-peer audio and video communication with the remote-control operator workstation 270. The G-SRMCD may employ the encryption and other network security techniques for WebRTC-based communication described in IETF RFC 8827 within a comprehensive network and data security plan for data communication between the G-SRMCD and the remote-controller operator 270. The G-SRMCD may utilize the session establishment techniques employed in WebRTC communication as described in IETF RFC 8825 and IETF 8829 in order compensate and adjust to changing network conditions. Video quality may be adjusted in response to bandwidth availability and may avoid network congestion to deliver the best possible voice and video communication. The G-SRMCD may employ WebRTC communication techniques in order to establish secure video and audio connections to the RMCC 260, and may also utilize the WebRTC data channel to exchange command, control and feedback information between the G-SRMCD and the remote-control operator 270.

The G-SRMCD may use SRTP media channels directed through the network between the host compute module 230 and the remote-control workstation 270. These SRTP media channels accomplish the lowest possible latency from camera to monitoring screen because they can be configured to avoid the use of any type of network-based relay. The G-SRMCD may employ the Interactive Connectivity Establishment (ICE) protocols in order to aid in the establishment of the SRTP channels through heterogeneous network routers between the G-SRMCD and the RMCC.

Low latency of communication between the host compute module 230 and the remote-control workstation 270 is also suitable in the context of remote control. It may be suitable for safety that commands induced by operating the control equipment by the remote-control operator reach the host compute module 230 in a relatively short time, and also for the feedback messages from the unit's control module to reach the monitoring and control workstation in a relatively short time. For the exchange of control messages, the G-SRMCD may make use of the WebRTC-specified data channel, as specified by IETF RFC 8831, which is negotiated between the remote-control workstation 270 and the host compute module 230 at the same time when the remote-control operator starts an engagement with the unit. The WebRTC data channel is a lowest-latency, reliable datagram path where control commands from the remote-control workstation 270 can be exchanged for feedback information from the unit.

Figure 3:
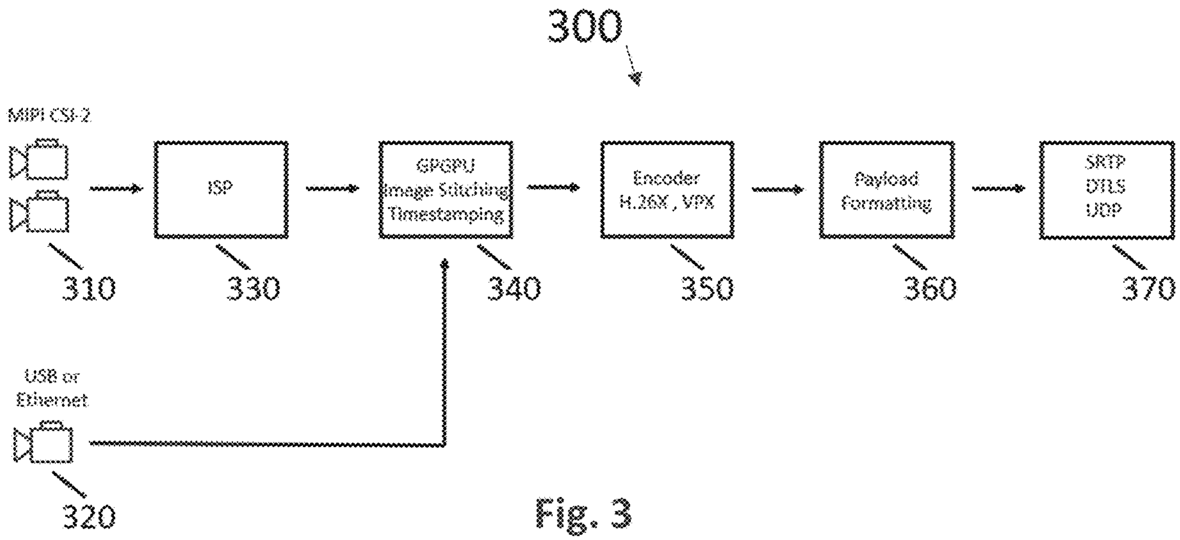
FIG. 3 is a graphical representation of the software blocks of the ultra-low latency video streaming system in accordance with various embodiments of the present disclosure.

FIG. 3 illustrates a schematic block diagram of the software modules in the ultra-low latency video processing pipeline. The video processing pipeline may make use of the parallel processing resources of the G-SRMCD's embedded CPU/GPU system-on-module (SOM).

The G-SRMCD may have one or more camera modules 310 connected via MIPI CSI-2 interface with perhaps an FPDLink III or GMSL or GMSL2 serializer/deserializer between the camera module and the embedded processor circuit board. The G-SRMCD may also have one or more camera modules 320 connected by USB 2.0, USB 3.0 or Ethernet interface. The camera image frame stream then enters the video processing pipeline made up of hardware and software components in the G-SRMCD's embedded system-on-module board as follows.

Video image frame streams from MIPI CSI-2 connected camera modules 310 enter hardware-based image signal processors (ISP) 330 provided by the G-SRMCD's SOM. Video image frame streams from USB or Ethernet connected camera modules will be debayered by the camera module itself, or by the Video-For-Linux-2 (V4L2) driver in the embedded SOM's operating system kernel. In both cases, the video image stream is delivered to the remaining pipeline components as an OpenGL API "EGLStream". In the MIPI CSI-2 case, the video image frame stream may be transmitted through the pipeline with no memory buffer copies, which is suitable for maintaining a low processing latency through the pipeline.

The debayered video image stream may then be processed by an application-specific proprietary algorithm elaborated in a General-Purpose Computing on GPUs (GPGPU) 340 environment such as OpenCL or CUDA. One example of an application-specific use of the GPGPU environment is the computational combination video image frame streams from two or more cameras into a single larger seamless image stream with a wider panorama (video stitching). Another example of an application-specific algorithm is the embedding of a coded timestamp into the corner pixels of the image, to be decoded by the remote monitor and control workstation in the RMCC for the purpose of being able to monitor the video latency in real time.

The video image stream then enters the GPU-based video encoder 350 and is compressed to a lower bitrate H.264, H.265, VP8 or VP9 codec bitstream suitable for transmission over the mobile data network. The coded bitstream is then formatted into RTP payload messages 360 and finally transmitted through the network to the remote monitor and control workstation in the RMCC using SRTP protocol over DTLS/UDP 370.

The glass-to-glass (camera-to-monitor) latency is obtained by calculating the difference between the timestamp at the moment of capturing an image in 210*a*, 210*b* or 210*c*and the timestamp when the same image is displayed on the agent's monitor 270.

Experimental setup and results are now described for the example embodiment of the ultra-low latency video streaming system 200. The experimental setup consists of a OmniVision OV10640 image sensor, FPD-Link III serializer/deserializer, Nvidia Jetson TX2 and a Sierra Wireless Airlink MP70 router. On the private LTE network, the Airspan AirSpeed 1030 eNodeB is connected to a local network where the Evolve Packet Core (EPC) components and the remote-monitor control station are installed. The used spectrum is the Citizens Broadband Radio Service (CBRS) that occupies 150 MHz of shared spectrum in the 3.5 GHz C-band, also known as Band 48 (B48). On the public wireless network, the AT&T Pod19 network may be used. The remote-monitor control station is a desktop PC with an i7 core processor. Also, the VP8 and VP9 and H.265 codecs with 720p and 1080p resolutions at 30 FPS were used as the video/image encoding/decoding techniques. A GEM e4 vehicle carried the G-SRMCD to remotely monitor and control the electric vehicle. To store the collected data, the remote-monitor control station recorded the glass-to-glass latency every second and take the average time across 500 samples.

The average latency per codec/resolution/type of network, its standard deviation and number of samples are presented in Table 1. Data in the latency column is averaged over the number of samples collected in 500 seconds driving the vehicle in a 70-meter radius circle, the shortest distance to the antenna is 100 meters and the maximum is 240 meters.

TABLE 1

| Test No. | Network Type Resolution Codec | Average Latency (ms) | Standard Deviation | Number of Samples |
|---|---|---|---|---|
| 1 | Private LTE 720p VP8 | 37.27 | 4.36 | 500 |
| 2 | Private LTE 720p VP9 | 30.40 | 4.13 | 500 |
| 3 | Private LTE 720p H.265 | 35.03 | 4.42 | 500 |
| 4 | Private LTE 1080p VP8 | 39.45 | 4.06 | 500 |
| 5 | Private LTE 1080p VP9 | 34.81 | 5.56 | 500 |
| 6 | Private LTE 1080p H.265 | 40.34 | 4.25 | 500 |
| 7 | Public LTE 720p VP8 | 72.88 | 10.61 | 500 |
| 8 | Public LTE 720p VP9 | 73.75 | 13.19 | 500 |
| 9 | Public LTE 720p H.265 | 71.12 | 7.12 | 500 |
| 10 | Public LTE 1080p VP8 | 77.92 | 11.83 | 500 |
| 11 | Public LTE 1080p VP9 | 79.24 | 11.69 | 500 |
| 12 | Public LTE 1080p H.265 | 75.95 | 8.17 | 500 |

Figure 4:
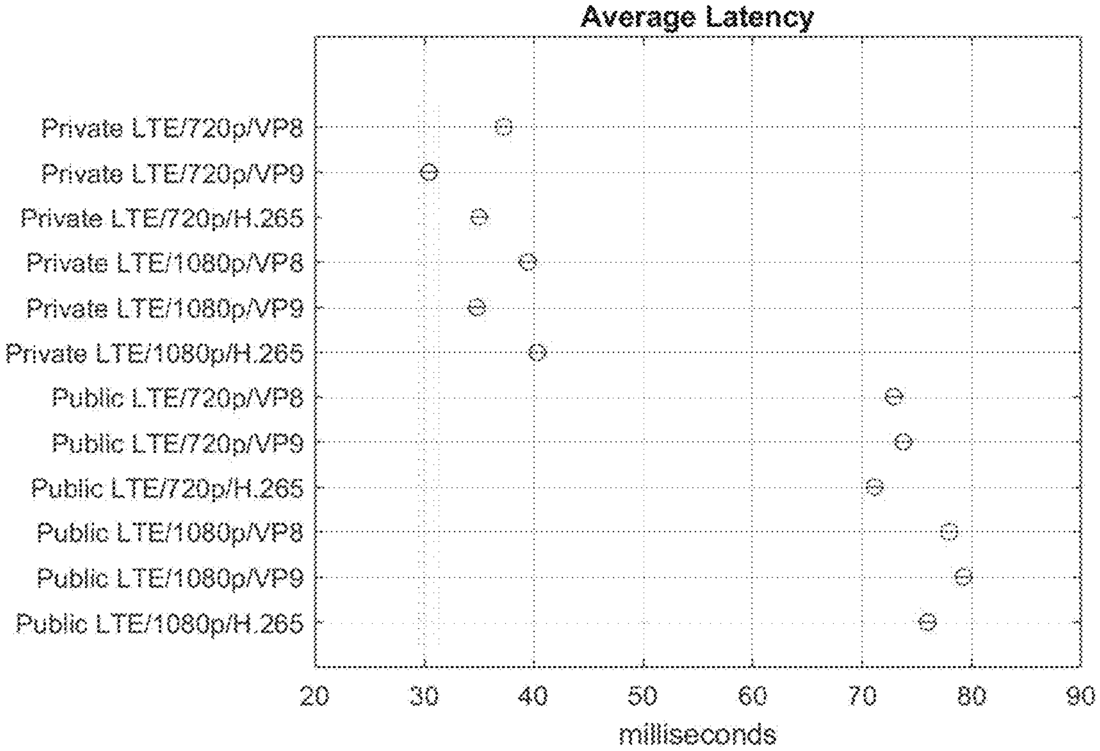
FIG. 4 is a graphical representation of the average latency of the ultra-low latency video streaming system in accordance with various embodiments of the present disclosure.

A comparison between all the evaluated scenarios is presented in FIG. 4, displaying graphs with each group mean represented by the symbol (°) and the 95% confidence interval as a line through the symbol. The tested scenario means are significantly different if their intervals are disjoint, and are not significantly different if their intervals overlap. Suitable performance scenarios may be given by using a private LTE wireless network combination. The private wireless network secures bandwidth with low latency and provides predictable performance, in combination with the accelerated GPU video processing provided the lowest average latency of 30.40 milliseconds.

TABLE 2

| Test | Average Latency | Latency HSD |
|---|---|---|
| Private LTE 720p VP9 | 30.40 | a |
| Private LTE 1080p VP9 | 34.81 | b |
| Private LTE 720p H.265 | 35.03 | bc |
| Private LTE 720p VP8 | 37.27 | cd |
| Private LTE 1080p | 39.45 | de |

TABLE 2-continued

| Test | Average Latency | Latency HSD |
|---|---|---|
| VP8 | | |
| Private LTE 1080p H.265 | 40.34 | e |
| Public LTE 720p H.265 | 71.12 | f |
| Public LTE 720p VP8 | 72.88 | fg |
| Public LTE 720p VP9 | 73.75 | gh |
| Public LTE 1080p H.265 | 75.95 | hi |
| Public LTE 1080p VP8 | 77.92 | ij |
| Public LTE 1080p VP9 | 79.24 | j |

The Tukey's Honestly Significant Difference (HSD) test was performed to further investigate these results. The HSD is a statistical test comparing the mean value of the performance measure for the different activation functions. All tests of statistical significance use an $\alpha=5\%$. Two test scenarios with the same block letter are not significantly different with 95% statistical confidence (e.g., group a is significantly different than group b). The HSD test in Table 2 shows the VP9 codec, 720p on a private LTE network is statistically better than the rest of the tested scenarios. In a 1080p resolution, VP9 codec is also statistically better than the rest of the 1080p scenarios in a private LTE network. In a public LTE network, the H.265 codec provided the lowest latency for both tested resolutions (720p and 1080p).

Figure 5:
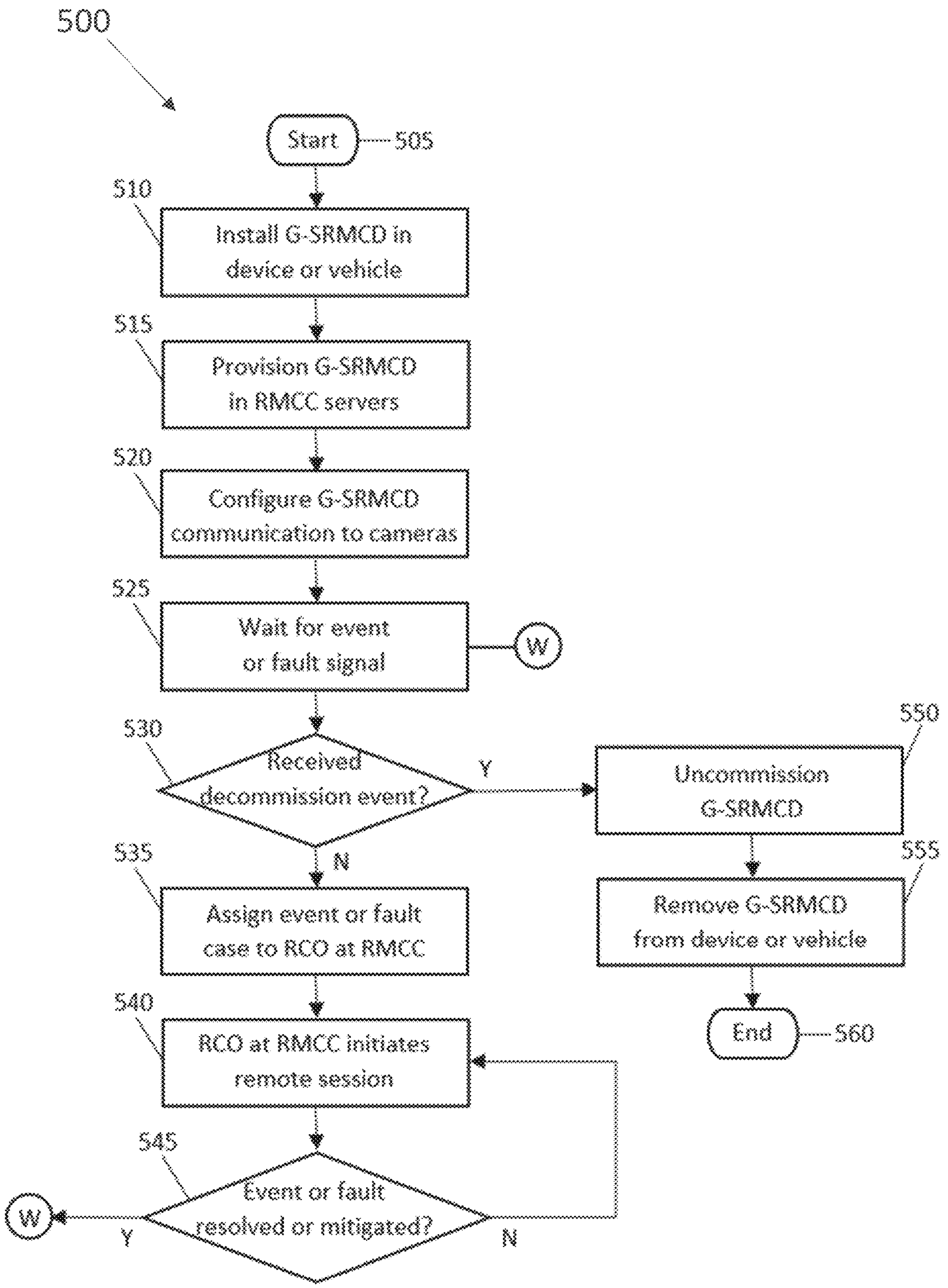
FIG. 5 is a flowchart illustrating an exemplary process for providing the ultra-low latency video streaming system.

An exemplary operation of the exemplary disclosed system, apparatus, and method will now be described. FIG. 5 illustrates an exemplary process 500 of the exemplary disclosed system. Process 500 begins at step 505. At step 510, the exemplary disclosed system may provide a Generic Smart Remote Monitoring Control Device (G-SRMCD e.g., device 110*a*, 110*b*, or 110*c*) including a processor, to be installed in a vehicle or device. At step 515, the exemplary disclosed system may provision and configure the G-SRMCD to communicate with a remote monitor and control center (e.g., RMCC 130). At step 520, the exemplary disclosed system may configure the G-SRMCD to communicate with a collection of devices including at least one camera disposed at a vehicle, robot or drone (e.g., unit 101*a*, 101*b*, or 101*c*). At step 525, the exemplary disclosed system may transmit a message to the RMCC 130 indicating some type of event or fault detected via one or more camera sensors (e.g., including sensors and/or cameras). At step 530, the exemplary disclosed system may determine whether or not the event message indicates a request for the G-SRMCD (e.g., device 110*a*, 110*b* or 110*c*) to be decommissioned. If, at step 530, the event message received at the RMCC 130 does not indicate a decommissioning request, process 500 continues to step 535. At step 535, the RMCC 130 may assign an event case ticket to an available Remote-Control Operator (RCO). At step 540, the RCO may initiate a remote communication session between a workstation 140 at the RMCC 130 and the G-SRMCD (e.g., device 110*a*, 110*b*, or 110*c*). The remote-control operator may begin the transfer and display of audio and video streams and the exchange of command and reporting data. At step 545, the RCO may determine if the condition indicated by the event or fault message received at the RMCC 130 at step 525 has been resolved and/or mitigated. If, at step 545, the condition is determined to have been resolved and/or mitigated, process 500 continues to step 525. If, at step 530, the event message does indicate a decommissioning request, process 500 continues to step 550. At step 550, the G-SRMCD (e.g., device 110*a*, 110*b*, or 110*c*) may be unprovisioned (e.g., uncommissioned) from the RMCC 130. At step 555, the G-SRMCD (e.g., device 110*a*, 110*b*, or 110*c*) may be removed from the vehicle, robot or drone. Process 500 ends at step 560.

In at least some exemplary embodiments, the G-SRMCD (e.g., device 110*a*, 110*b*, or 110*c*) may include a human interface installed in a passenger area or a cabin of the vehicle, robot or drone (e.g., unit 101*a*, 101*b*, or 101*c*). The passenger interface may allow the exemplary disclosed G-SRMCD to interact with the passengers and allow them to contact a remote-control operator in the RMCC 130 for example in case of an emergency or to make a request related to the autonomous vehicle. The human interface may provide data transfer and/or a two-way video and audio communication to the exemplary disclosed RMCC (e.g., having the exemplary disclosed low latency). For example, a passenger may request the RMCC to increase monitoring or more closely monitor the vehicle, robot or drone (e.g., unit 101*a*, 101*b*, or 101*c*) and/or assume control of the vehicle, robot or drone (e.g., unit 101*a*, 101*b*, or 101*c*) via any suitable data transfer (e.g., pushing a button or other interface control, audio or video data, or any other suitable technique for communicating with the RMCC). The human interface may also provide a display with multiple buttons to request, for example, video communication with a remote-control operator, contact emergency services, panic button, display current autonomous unit location on a map, play informative videos, and/or other suitable features. The human interface may be installed in autonomous robots or drones to aid in situations where it may be suitable for the unit to interact with a human.

In at least some exemplary embodiments, the G-SRMCD (e.g., device 110*a*, 110*b*, or 110*c*) may include an external interface installed at a surface or in a surface portion of the vehicle, robot or drone (e.g., unit 101*a*, 101*b*, or 101*c*). The external interface may allow the exemplary disclosed G-SRMCD to interact with pedestrians, bicyclists, bystanders, parties in other vehicles, other autonomous vehicles, and/or any other suitable third party and allow the third parties to contact a remote-control operator in the RMCC 130 for example in case of an emergency or to make a request related to the autonomous vehicle. The external interface may provide data transfer and/or a two-way video and audio communication to the exemplary disclosed RMCC (e.g., having the exemplary disclosed low latency). For example, a third party may request that the RMCC increase monitoring or more closely monitor the vehicle, robot or drone (e.g., unit 101*a*, 101*b*, or 101*c*) and/or assume control of the vehicle, robot or drone (e.g., unit 101*a*, 101*b*, or 101*c*) via any suitable data transfer (e.g., audio or video data, or any other suitable technique for communicating with the RMCC). For example, if a third party observes the vehicle, robot or drone (e.g., unit 101*a*, 101*b*, or 101*c*) operating in an erratic or unsuitable manner, the third party may alert the RMCC via the external interface. For example, by yelling at the vehicle, robot or drone, data (e.g., audio data) may be transferred to the RMCC and suitable action may be taken (e.g., the RMCC may more closely monitor and/or assume control of the vehicle, robot or drone). The vehicle, robot or drone (e.g., unit 101*a*, 101*b*, or 101*c*) may also include interface components (e.g., a panic button or a speaker) that may be provided for interaction with third parties in emergency situations (e.g., and may also include components as set forth in any applicable government regulations governing the operation of autonomous units in public places). The external interface can be installed in autonomous robots or drones to aid in situations where it may be suitable for the unit to interact with humans or other autonomous vehicles external to the vehicle, robot or drone (e.g., unit 101*a*, 101*b*, or 101*c*).

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

At least some exemplary embodiments of the present disclosure also relate to an apparatus for performing the operations herein. This apparatus may be specially constructed for the desired purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. Some or all functionalities described above could also be provided by private or public cloud-based Data Centers (DC).

The algorithms and operations presented herein are not inherently related to any particular computer or other apparatus. Various general-purpose systems may also be used with programs in accordance with the teachings herein, or it may prove convenient to construct more specialized apparatuses to perform the desired method steps. The desired structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, any logic or application described herein, including the application(s) in Host Compute Module 230 and RMCC 260, that comprises software or code can be embodied in any non-transitory computer-readable medium for use by or in connection with an instruction execution system such as, for example, a host compute module 230 or RMCC 260 in a computer system, embedded system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), secure digital card (SD) or other type of memory device.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on this application based hereon. Accordingly, the disclosure of the embodiments of the invention is intended to be illustrative, but not limiting, of the scope of the invention.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

It will be appreciated that computer program instructions may include computer executable code. A variety of languages for expressing computer program instructions are possible, including without limitation C, C++, Java, JavaScript, Python, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

While the foregoing drawings and description set forth functional aspects of the disclosed systems, no particular arrangement of software for implementing these functional aspects should be inferred from these descriptions unless explicitly stated or otherwise clear from the context.

While multiple embodiments are disclosed, still other embodiments of the present disclosure will become apparent to those skilled in the art from this detailed description. The alternatives described herein are examples for illustration only and not to limit the alternatives in any way. The steps of the invention can be performed in a different order and still achieve desirable results. It will be obvious to persons skilled in the art to make various changes and modifications to the invention described herein. To the extent that these variations depart from the scope and spirit of what is described herein, they are intended to be encompassed therein. It will be understood by those skilled in the art that various changes in form and details may be made therein without departing from the scope of the invention encompassed by the appended claims.

What is claimed is:

1. A method, comprising:

providing a remote monitoring control device including a processor;

configuring the remote monitoring control device to communicate with a remote monitoring control center;

configuring the remote monitoring control device to communicate with a collection device, which includes a camera sensor including at least one of a sensor or at least one USB or Ethernet camera, disposed at an autonomous unit; and transferring a processed data stream including a near real-time video stream of the collection device from the remote monitoring control device to the remote monitoring control center; and using the remote monitoring control device to format an encoded bitstream of the reduced bitrate bitstream into RTP or SRTP messages; and wherein the remote monitoring control device uses an accelerated video encoder that encodes a video stream into a reduced bitrate bitstream with one of several video codecs using GPU parallel processing on an embedded system-on-module.

2. A remote monitoring and control system capable of carrying out the method recited in claim 1.

3. The remote monitoring control system of claim 2, wherein when the camera sensor is greater than 30 cm from the remote control module of the remote monitoring control device, the remote monitoring control device uses FPD-Link III serializer and deserializer modules to transport high bandwidth data of the near real-time video stream from the camera sensor to the remote monitoring control device.

4. The remote monitoring control system of claim 3, wherein the FPD-Link III serializer and deserializer modules are GMSL or GMSL2 serializer and deserializer modules.

5. The remote monitoring control system of claim 2, a communication protocol is used to establish encrypted audio and video streams and encrypted command and response data with the remote monitoring control center, and wherein the communication protocol is used as a transport for WebRTC "RTCPeerConnection" methods in order to negotiate and establish encrypted SRTP streams transporting audio and video, and command and response data via a WebRTC data channel.

6. The remote monitoring control system of claim 2, wherein:

the autonomous unit is one of a plurality of autonomous units; and the remote monitoring control center is configured to communicate with a remote-control operator via an WebRTC-enabled browser of the remote-control operator, the WebRTC-enabled browser configured to display multiple video streams from the plurality of autonomous units; and wherein the WebRTC data channel is configured to exchange data between the remote monitoring control device and the remote monitoring control center, the data including control instructions to the autonomous unit that is a vehicle, a robot, or a drone.

7. A method, comprising:

providing a remote monitoring control device including a processor;

configuring the remote monitoring control device to communicate with a remote monitoring control center;

configuring the remote monitoring control device to communicate with a collection device, which includes a camera sensor including at least one of a sensor or at least one USB or Ethernet camera, disposed at an autonomous unit; and transferring a processed data stream including a near real-time video stream of the collection device from the remote monitoring control device to the remote monitoring control center; and using the remote monitoring control device to establish a secure websocket connection to an internet cloud-based server to perform a WebRTC session negotiation with the remote monitoring control center, and to establish RTP/UDP, SRTP/UDP, and SCTP data channel paths for the exchange of camera image streams and command and control data with the remote monitoring control center.

8. The method of claim 7, wherein transferring the processed data stream from the remote monitoring control device to the remote monitoring control center includes transferring a high bandwidth audio, video, and data streams via a commercial public LTE/4G/5G network, a private LTE network, or a Wi-Fi network, and wherein the remote monitoring control device is programmed to read camera image data of the processed data stream to place a camera image frame bitstream directly into a zero-copy EGL context, and wherein the remote monitoring control device provides Bayer-to-YUV conversion using a hardware-based image signal processor of an embedded system-on-module.

9. The method of claim 7, wherein the remote monitoring control device uses a General-Purpose Computing on GPUs parallel computing resources environment to computationally combine image frame bitstreams from the at least one camera, which includes two or more cameras, into a single seamless image stream with a panorama, the single seamless image stream being larger than a single camera image stream and the panorama being larger than a single camera panorama.

10. The method of claim 7, wherein the remote monitoring control device uses an accelerated video encoder that encodes a video stream into a reduced bitrate bitstream with one of several video codecs using GPU parallel processing on an embedded system-on-module.

11. The method of claim 7, further comprising using the remote monitoring control device to format an encoded bitstream of the reduced bitrate bitstream into RTP or SRTP messages, and using the remote monitoring control device to negotiate a transmission of RTP/SRTP audio and video streams of the encoded bitstream to the remote monitoring control center using ICE protocols.

12. The method of claim 7, further comprising using the remote monitoring control device to establish a two-way data exchange on a data channel of the processed data stream to exchange timestamped command, control, and telemetry feedback messages between the remote monitoring control device and the remote monitoring control center.

13. The method of claim 7, further comprising using the remote monitoring control device to support a WebRTC data channel of the processed data stream to exchange status and alarm messages between the remote monitoring control device and the remote monitoring control center that indicate a loss of incoming signal, a late arrival of command messages, or a safety alert.

14. The method of claim 7, wherein the remote monitoring control device uses a plurality of timestamps contained in a plurality of messages carried by a WebRTC data channel of the processed data stream to measure a delay between the remote monitoring control device and the remote monitoring control center for safe teleoperation of the autonomous unit that is a vehicle, a robot, or a drone.

15. The method of claim 7, further comprising transferring a data of a passenger of the autonomous unit via a human interface from the remote monitoring control device to the remote monitoring control center, the data instructing the remote monitoring control center to increase monitoring of the autonomous unit or assume control of the autonomous unit.

16. The method of claim 7, further comprising transferring a data of a third party external to the autonomous unit via an external interface, which is disposed at a surface or in a surface portion of the autonomous unit, from the remote monitoring control device to the remote monitoring control center, the data instructing the remote monitoring control center to increase monitoring of the autonomous unit or assume control of the autonomous unit.

17. A method, comprising:

providing a remote monitoring control device including a processor;

configuring the remote monitoring control device to communicate with a remote monitoring control center;

configuring the remote monitoring control device to communicate with a collection device, which includes a camera sensor including at least one of a sensor or at least one USB or Ethernet camera, disposed at an autonomous unit; and transferring a processed data stream including a near real-time video stream of the collection device from the remote monitoring control device to the remote monitoring control center; and transferring a data of a third party external to the autonomous unit via an external interface, which is disposed at a surface or in a surface portion of the autonomous unit, from the remote monitoring control device to the remote monitoring control center, the data instructing the remote monitoring control center to increase monitoring of the autonomous unit or assume control of the autonomous unit.

18. The method of claim 17, wherein the remote monitoring control device uses an accelerated video encoder that encodes a video stream into a reduced bitrate bitstream with one of several video codecs using GPU parallel processing on an embedded system-on-module.

19. The method of claim 17, further comprising:

using the remote monitoring control device to format an encoded bitstream of the reduced bitrate bitstream into RTP or SRTP messages;

using the remote monitoring control device to negotiate a transmission of RTP/SRTP audio and video streams of the encoded bitstream to the remote monitoring control center using ICE protocols; and using the remote monitoring control device to establish a two-way data exchange on a data channel of the processed data stream to exchange timestamped command, control, and telemetry feedback messages between the remote monitoring control device and the remote monitoring control center.

20. The method of claim 17, further comprising using the remote monitoring control device to support a WebRTC data channel of the processed data stream to exchange status and alarm messages between the remote monitoring control device and the remote monitoring control center that indicate a loss of incoming signal, a late arrival of command messages, or a safety alert.

21. The method of claim 17, further comprising transferring a data of a passenger of the autonomous unit via a human interface from the remote monitoring control device to the remote monitoring control center, the data instructing the remote monitoring control center to increase monitoring of the autonomous unit or assume control of the autonomous unit.

* * * * *